(12) United States Patent
Horsnell et al.

(10) Patent No.: US 8,966,282 B2
(45) Date of Patent: Feb. 24, 2015

(54) CRYPTOGRAPHIC SUPPORT INSTRUCTIONS

(71) Applicant: ARM Limited, Cambridge (GB)

(72) Inventors: Matthew James Horsnell, Cambridge (GB); Richard Roy Grisenthwaite, Cambridge (GB); Daniel Kershaw, Cambridge (GB); Stuart David Biles, Cambridge (GB)

(73) Assignee: ARM Limited, Cambridge (GB)

( * ) Notice: Subject to any disclaimer, the term of this patent is extended or adjusted under 35 U.S.C. 154(b) by 57 days.

(21) Appl. No.: 13/627,209

(22) Filed: Sep. 26, 2012

(65) Prior Publication Data

US 2013/0132737 A1    May 23, 2013

(30) Foreign Application Priority Data

Nov. 17, 2011   (GB) .................................. 1119834.8

(51) Int. Cl.
| G06F 11/30 | (2006.01) |
| G06F 9/30 | (2006.01) |
| G06F 9/38 | (2006.01) |
| G06F 21/60 | (2013.01) |
| G09C 1/00 | (2006.01) |
| H04L 9/32 | (2006.01) |
| H04L 9/06 | (2006.01) |

(52) U.S. Cl.
CPC ........ *G06F 9/30007* (2013.01); *G06F 9/30029* (2013.01); *G06F 9/30032* (2013.01); *G06F 9/30036* (2013.01); *G06F 9/3887* (2013.01); *G06F 21/602* (2013.01); *G09C 1/00* (2013.01); *H04L 9/3239* (2013.01); *H04L 2209/12* (2013.01); *H04L 2209/125* (2013.01); *H04L 9/0643* (2013.01)
USPC ........................................................ 713/190

(58) Field of Classification Search
USPC ........................................................ 713/190
See application file for complete search history.

(56) References Cited

U.S. PATENT DOCUMENTS

| 5,918,062 | A | 6/1999 | Oberman et al. |
| 6,377,970 | B1 | 4/2002 | Abdallah et al. |
| 7,599,489 | B1 * | 10/2009 | Spracklen ........................ 380/28 |
| 2006/0190700 | A1 * | 8/2006 | Altman et al. ..................... 712/7 |
| 2006/0227966 | A1 * | 10/2006 | Knowles .......................... 380/42 |
| 2009/0198966 | A1 | 8/2009 | Gschwind et al. |

(Continued)

FOREIGN PATENT DOCUMENTS

WO   WO 03/107177   12/2003

OTHER PUBLICATIONS

Search Report for GB1119834.8, dated Mar. 2, 2012.

(Continued)

*Primary Examiner* — Pramila Parthasarathy
(74) *Attorney, Agent, or Firm* — Nixon & Vanderhye P.C.

(57) ABSTRACT

A data processing system 2 includes a single instruction multiple data register file 12 and single instruction multiple processing circuitry 14. The single instruction multiple data processing circuitry 14 supports execution of cryptographic processing instructions for performing parts of a hash algorithm. The operands are stored within the single instruction multiple data register file 12. The cryptographic support instructions do not follow normal lane-based processing and generate output operands in which the different portions of the output operand depend upon multiple different elements within the input operand.

26 Claims, 3 Drawing Sheets

(56) References Cited

U.S. PATENT DOCUMENTS

2010/0115232 A1    5/2010    Johnson et al.
2011/0161624 A1    6/2011    Flachs et al.

OTHER PUBLICATIONS

Yu et al., "Efficient Implementation of elliptic curve cryptography (ECC) on VLIW-micro-architecture media processor", *2004 IEEE International Conference on Multimedia and Expo*, 2004, pp. 879-882.

Gueron, "Intel's Advanced Encryption Standard (AES) Instructions Set", *Intel*, Apr. 2009, 58 pgs.

PCT International Search Report and Written Opinion of the International Searching Authority mailed Dec. 18, 2012 in PCT/GB2012/052315.

"AltiVec™ Technology Programming Interface Manual" freescale semiconductor, Jun. 1999, 259 pages.

I. Rickards, "ARM Architecture & NEON" Apr. 2010, 46 pages.

T. Oliveira et al, "Improving the performance of Luffa Hash Algorithm" International Association for Cryptologic Research, Aug. 2010, 15 pages.

O. Aciicmez, "Fast Hashing on Pentium SIMD Architecture" Thesis, May 2004, pp. 1-43.

\* cited by examiner

CRYPTOGRAPHIC SUPPORT INSTRUCTIONS

BACKGROUND OF THE INVENTION

1. Field of the Invention

This application claims priority to GB Application No. 1119834.8 filed Nov. 17, 2011, the entire contents of which are incorporated herein by reference.

This invention relates to the field of data processing systems. More particularly, this invention relates to the provision of cryptographic support instructions within data processing systems.

2. Description of the Prior Art

It is known to use data processing systems to perform cryptographic operations. Examples of such known cryptographic processing operations include the Secure Hash Algorithm (SHA). The SHA has a variety of different known forms including SHA-1, SHA-2, SHA256 and SHA512. These algorithms are computationally intensive.

One known approach to supporting these algorithms is to use a general purpose processor executing general purpose instruction with its general purpose register file. A problem with this approach is that the large amounts of state data which has to be manipulated in performing these algorithms, which typically can generate hash values of 160-bits and upwards, has the result that the operations often have to be split down and performed by a long sequence of individual program instructions operating on parts of the data at a time thereby resulting in a disadvantageous increase in the amount of time required to execute the algorithms and the energy consumed in executing the algorithms.

Another known approach is to provide a special purpose cryptographic support processor, such as a cryptographic coprocessor, which has dedicated circuitry for performing the algorithms and is typically initiated by passing a pointer to the start of the data to be hashed and then waiting to receive the resulting hash value. A problem with this approach is that extra cost and complexity is incurred by the provision of the special purpose cryptographic hardware. Furthermore, problems arise in integrating the operation of the special purpose hardware with the other operations of the device, such as interrupt handling, multitasking and the like, since the special purpose cryptographic hardware is difficult and complex to incorporate within the mechanisms normally provided within the data processing system to deal with such aspects of the operation with the data processing system.

SUMMARY OF THE INVENTION

Viewed from one aspect the present invention provides a data processing apparatus comprising:

a single instruction multiple data register file; and single instruction multiple data processing circuitry coupled to said single instruction multiple data register file and configured to be controlled by a single instruction multiple data program instruction to perform a processing operation independently upon separate data elements stored within separate lanes within an input operand register of said single instruction multiple data register file; wherein said single instruction multiple data processing circuitry is configured to be controlled by a further program instruction to perform a further processing operation upon a vector data value comprising a sequence of data elements held within an input operand register of said single instruction multiple data register file to produce an output operand stored within and an output operand register of said single instruction multiple data register file, said output operand having a first portion with a value dependent upon all data elements within said sequence of data elements.

The present technique recognises that many data processing systems are already provided with single instruction multiple data processing mechanisms. Such single instruction multiple data processing mechanisms typically include a single instruction multiple data register file which has a large storage capacity capable of storing and manipulating the large data width operands that are typically involved in single instruction multiple data processing. It is normal in single instruction multiple data processing that the separate lanes of data are independently processed under control of a single program instruction. For example, the separate lanes of data may comprise component values of a colour pixel value, or other vector value, all to be subject to the same processing operation, such as scaling. The present technique recognises that the storage capabilities of the single instruction multiple data register file can be reused with further program instruction that do not follow the normal form of single instruction multiple data program instructions. In particular, the processing of the lanes need not be independent and an output operand generated may have a first portion with a value dependent upon all data elements within a vector data value forming an input.

The reuse of the single instruction multiple register file outside of the area of single instruction multiple data program instructions may be applied to a variety of areas, such as data compression and data cryptography. The technique is particularly well suited to data cryptography.

In this context, the further program instruction may be arranged to perform an iterative processing operation consuming successive words of data and at least portions of an intermediate hash value in order to generate an output hash value. Hash value generation typically requires the manipulation of large volumes of data and a register file with the capability to store and manipulate unusually long operand values.

One form of the further program instruction is where said further program instruction has a first input operand $Qd[127:0]$ and a second input operand $Sn[31:0]$ both read from said single instruction multiple data register file and said vector data value comprises $Vm[Index+31:Index]$ where Index is 0 to $2^N$, where N is a positive integer, said further processing operation producing said output operand $Qd_{output}[127:0]$ to have a value the same as given by the steps:

```
X[127:0] = Qd[127:0];
Y[31:0] = Sn[31:0];
for (I = 0 to (2^N–1));
    {
        Index = (I*32);
        t1[31:0] = OP FUNC (X[63:32], X[95:64], X[127:96]);
        Y[31:0] = Y[31:0] + ROL(X[31:1], 5) + T1[31:0] +
        Vm[Index+31:Index];
        X[63:32] = ROL(X[63:32], 30);
        T2[31:0] = Y[31:0];
        Y[31:0] = X[127:96];
        X[127:0] = {X[95:0]:T2[31:0]}
    }
Qd_output[127:0] = X[127:0];
``` where OP FUNC (B, C, D) is one of: (((C XOR D) AND B) XOR D); (B XOR C XOR D); and (B AND C) OR ((B OR C) AND D); and ROL (P, Q) is a left rotate of value P by Q bit positions.

This form of iterative program instruction is well suited to implementing the SHA-1 algorithm. It will be appreciated that the operations defined above are given in the form of pseudo code and may be implemented in a variety of different hardware forms as will be well understood by those skilled in this technical field. In particular, a low circuit overhead implementation may re-circulate values to perform iterative operation where as a higher performance implementation may seek to perform at least portions of different iterations in parallel.

Another form of the further program instruction has a first input operand Qd[127:0] and a second input operand Sn[31:0] both read from said single instruction multiple data register file and said vector data value comprises Vm[Index+31:Index] where Index is 0 to $2^N$, where N is a positive integer, said further processing operation producing said output operand $Qd_{output}$[127:0] to have a value the same as given by the steps:

```
X[127:0] = Qd[127:0];
Y[31:0] = Sn[31:0];
for (I = 0 to (2^N−1));
    {
        Index   = (I * 32);
        T1[31:0] = OP_FUNC(X[63:32], X[95:64], X[127:96]);
        Y       = Y + ROL(X[31:0], 5) + T1[31:0] +
        Vm[(Index + 31):Index];
        X[63:32] = ROL(X[63:32], 30);
        T2[31:0] = Y;
        Y       = X[127:96];
        X[127:0] = {X[95:0]:T2[31:0]};
    }
Qd_output[127:0] = {0:Y[31:0]};
``` where OP FUNC (B, C, D) is one of: (((C XOR D) AND B) XOR D); (B XOR C XOR D); and (B AND C) OR ((B OR C) AND D); and ROL (P, Q) is a left rotate of value P by Q bit positions.

The choice of the function evaluated by OP FUNC may be made in dependence upon a particular field within the further program instruction or may be made in dependence upon how many iterations have been performed during the processing of a currently input block of data values to be hashed.

In some embodiments the single instruction multiple data register file may not have the capability to store all of the first input operand and the second input operand in a single register and accordingly these may be stored within separate registers within the single instruction multiple data register file. In other embodiments the first input operand and the second input operand may be stored within a shared register and may be considered as a single input operand.

In further embodiments, either in combination with the above further program instruction or instead of the above further program instruction, the present technique may provide support for the further program instruction having a first input operand Qd[127:0] and a second input operand Qn[127:0] both read from said single instruction multiple data register file and said vector data value comprises Vm[Index+31:Index] where Index is 0 to $2^N$, where N is a positive integer, said further processing operation producing said output operand $Qd_{output}$[127:0] to have a value the same as given by the steps:

```
X[127:0] = Qd[127:0];
Y[127:0] = Qn[127:0];
for (I = 0 to (2^N−1));
    {
        Index = (I*32);
        TCh[31:0] = Choose(Y[31:0], Y[63:32], Y[95:64]);
        TMaj[31:0] = Majority(X[31:0], Y[63:32], Y[95:64]);
        T1[31:0] = Y[127:96] + Sigma1(Y[31:0]) + TCh[31:0] +
        Vm[Index+31:Index];
        X[127:96] = T1[31:0] + X[127:96];
        Y[127:96] = T1[31:0] + Sigma0(X[31:0]) + TMaj[31:0]
        T2[31:0] = Y[127:96];
        Y[127:0] = {Y[95:0]:X[127:96]};
        X[127:0] = {X[95:0]:T2[31:0]}
    }
Qd_output[127:0] = X[127:0];
``` where Choose(B, C, D) is (((C XOR D) AND B) XOR D), Majority(B, C, D) is ((B AND C) OR ((B OR C) AND D)), Sigma0(B) is (ROR(B,2) XOR ROR(B, 13) XOR ROR(B, 22)), Sigma1(B) is (ROR(B,6) XOR ROR(B, 11) XOR ROR(B, 25)) and ROR (P, Q) is a right rotate of value P by Q bit positions.

In a similar way, the further program instruction may also have a form in which the further program instruction a first input operand Qd[127:0] and a second input operand Qn[127:0] both read from said single instruction multiple data register file and said vector data value comprises Vm[Index+31:Index] where Index is 0 to $2^N$, where N is a positive integer, said further processing operation producing said output operand $Qd_{output}$[127:0] to have a value the same as given by the steps:

```
X[127:0] = Qn[127:0];
Y[127:0] = Qd[127:0];
for (I = 0 to (2^N−1));
    {
        Index = (I*32);
        TCh[31:0] = Choose(Y[31:0], Y[63:32], Y[95:64]);
        TMaj[31:0] = Majority(X[31:0], Y[63:32], Y[95:64]);
        T1[31:0] = Y[127:96] + Sigma1(Y[31:0]) + TCh[31:0] +
        Vm[Index+31:Index];
        X[127:96] = T1[31:0] + X[127:96];
        Y[127:96] = T1[31:0] + Sigma0(X[31:0]) + TMaj[31:0]
        T2[31:0] = Y[127:96];
        Y[127:0] = {Y[95:0]:X[127:96]};
        X[127:0] = {X[95:0]:T2[31:0]}
    }
Qd_output[127:0] = Y[127:0];
``` where Choose(B, C, D) is (((C XOR D) AND B) XOR D), Majority(B, C, D) is ((B AND C) OR ((B OR C) AND D)), Sigma0(B) is (ROR(B,2) XOR ROR(B, 13) XOR ROR(B, 22)), Sigma1(B) is (ROR(B,6) XOR ROR(B, 11) XOR ROR(B, 25)) and ROR (P, Q) is a right rotate of value P by Q bit positions.

The above two forms of further program instruction are well suited to supporting the SHA-224 algorithm and the SHA256 algorithm.

The mechanism(s) for managing the processing of the further program instruction may conveniently be combined with the single instruction multiple data processing circuitry. The mechanism(s) for managing the processing of the further processing instruction use the single instruction multiple data instruction register file and implementation can be simplified when the mechanisms for managing the processing of the further program instruction (e.g. interrupt handling, scheduling) is integrated with that of the single instruction multiple data processing circuitry.

Aspects of managing the processing of the further program instruction which may be integrated with that of the single instruction multiple data processing circuitry include register renaming, instruction scheduling, instruction issue, instruction retirement and instruction interrupt. The single instruction multiple data processing circuitry typically already includes circuit elements which manage and support these operations and the further program instructions may be integrated into this management support relatively readily. This provides the advantage that if an interrupt occurs part way through the generation of a cryptographic hash value, then the normal interrupt handling mechanisms may be used to service that interrupt and restart or continue the hash calculation after the interrupt has been served with little addition overhead or complexity.

Support for hashing algorithms is further enhanced by the provision of a rotate instruction having an input operand Sm[31:0] and generating an output operand Sd[31:0] with a value the same as given by a right rotation of Sm[31:0] by two bit positions.

Another aspect of the processing of cryptographic hash algorithms that should be performed in addition to the generation of the intermediate hash values is the updating of the schedule of data elements within the file being processed. This updating of the schedule should be balanced in terms of work load with the hash generation in order not to introduce a disadvantageous bottleneck in the processing throughput. Accordingly, some embodiments of the present invention provide that said single instruction multiple data processing circuitry is configured to be controlled by a first schedule update instruction having a first input operand Sp[127:0] and a second input operand Sq[127:0] and generating an output operand Sr[127:0] with a value the same as given by the steps:

T[127:0]={Sp[63:0]:Sq[127:64]} and
Sr[127:0]=T[127:0] XOR Sr[127:0] XOR Sq[127:0].

Furthermore, some embodiments provide that said single instruction multiple data processing circuitry is configured to be controlled by a second schedule update instruction having an input operand Ss[127:0] and generating an output operand St[127:0] with a value the same as given by the steps:

T[127:0]=St[127:0] XOR {32{0}:Ss[127:32]};
St[95:0]={T[94:64]:T[95]:T[62:32]:T[63]:T[30:0]:T[31]}; and
St[127:96]=({T[126:96]:T[127]}) XOR ({T[29:0]:T[31:30]}).

The above two forms of program instruction are well suited to supporting the SHA-256 and the SHA-224 algorithms.

In order to help support the schedule generation in other forms of hash algorithm, some embodiments of such that said single instruction multiple data processing circuitry is configured to be controlled by a first schedule update instruction having an input operand Sp[127:0] and generating an output operand Sq[127:0] with a value the same as given by the steps:

T[127:0]={Sp[31:0]:Sq[127:32]};
T[127:0]=VecROR32(T[127:0], 7) XOR VecROR32(T[127:0], 18) XOR VecROR32(T[127:0], 3); and
Sq[127:0]=VecADD32(T[127:0], Sq[127:0]),
where VecROR32(A, B) is a separate right rotate by B bit positions of each 32-bit word within A and VecADD32(A, B) is a separate addition of each 32-bit word within A to a corresponding 32-bit word within B.

Further embodiments additionally provide said single instruction multiple data processing circuitry is configured to be controlled by a first schedule update instruction having a first input operand Sp[127:0] and a second input operand Sq[127:0] and generating an output operand Sr[127:0] with a value the same as given by the steps:

T0[127:0]={Sq[31:0]:Sp[127:32]};
T1[63:0]=Sq[127:64];
T1[63:0]=VecROR32(T1[63:0], 17) XOR VecROR32(T1[63:0], 19) XOR VecROR32(T1[63:0], 10);
T3[63:0]=VecADD32(Sr[63:0], T0[63:0]);
T1[63:0]=VecADD32(T3[63:0], T1[63:0]);
T2[63:0]=VecROR32(T1[63:0], 17) XOR VecROR32(T1[63:0], 19) XOR VecROR32(T1[63:0], 10);
T3[63:0]=VecADD32(Sr[127:64], T0[127:64]); and
Sr[127:0]={VecADD32(T3[63:0], T2[63:0]):T1[63:0]},
where VecROR32(A, B) is a separate right rotate by B bit positions of each 32-bit word within A and VecADD32(A, B) is a separate addition of each 32-bit word within A to a corresponding 32-bit word within B.

The above two forms of program instruction are well suited to supporting the SHA-256 algorithm.

Viewed from another aspect the present invention provides data processing apparatus comprising:

single instruction multiple data register file means for storing single instruction multiple data operands; and single instruction multiple data processing means for performing a processing operation under control of a single instruction multiple data program instruction, said single instruction multiple data processing means being coupled to said single instruction multiple data register file means and said processing operation being performed independently upon separate data elements stored within separate lanes within an input operand register of said single instruction multiple data register file means; wherein said single instruction multiple data processing means is controlled by a further program instruction to perform a further processing operation upon a vector data value comprising a sequence of data elements held within an input operand register of said single instruction multiple data register file means to produce an output operand stored within and an output operand register of said single instruction multiple data register file means, said output operand having a first portion with a value dependent upon all data elements within said sequence of data elements.

Viewed from a further aspect a present invention provides a method of processing data comprising the steps of:

storing single instruction multiple data operands within a single instruction multiple data register file;

under control of a single instruction multiple data program instruction performing a processing operation independently upon separate data elements stored within separate lanes within an input operand register of said single instruction multiple data register file; and under control of a further program instruction performing a further processing operation upon a vector data value comprising a sequence of data elements held within an input operand register of said single instruction multiple data register file to produce an output operand stored within and an output operand register of said single instruction multiple data register file, said output operand having a first portion with a value dependent upon all data elements within said sequence of data elements.

Another aspect of the invention is the provision of a virtual machine implementation which provides an execution environment on a general purpose computer that permits program instructions as detailed above to be executed as if they were executing upon the data processing apparatus detailed above. Such virtual machine implementations of the present techniques are encompassed here in.

DESCRIPTION OF EMBODIMENTS

Figure 1:
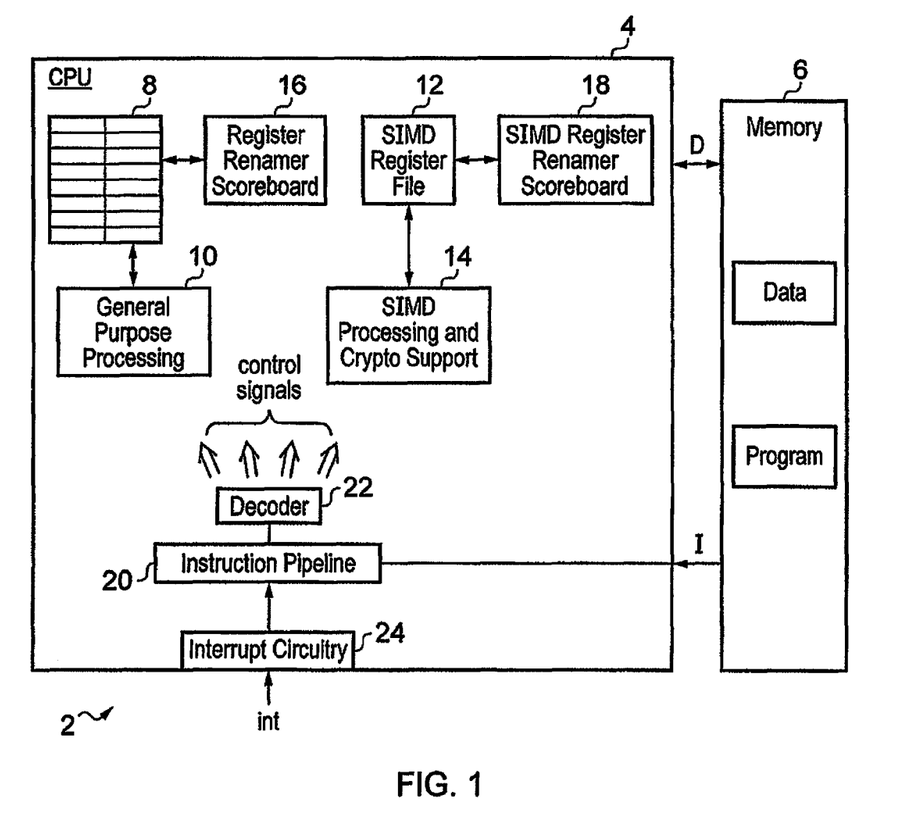
FIG. 1 schematically illustrates a data processing apparatus including a single instruction multiple data register file and single instruction multiple data processing circuitry including support for execution of cryptographic processing instructions.

FIG. 1 schematically illustrates data processing apparatus 2 in the form of central processing unit 4 couple to a memory 6 storing data to be manipulated and program instructions to be executed. The central processing unit 4 includes a general purpose register file 8, general purpose processing circuitry 10, a single instruction multiple data register file 12 and single instruction multiple data processing circuitry 14. The general purpose register file 8 typically contains low bit-width general purpose register (e.g. 32 or 64 bits), such as registers of the form supported by the general purpose register file of processors produced by ARM Limited of Cambridge, England. The single instruction multiple data register file 12 typically includes much larger registers and the data storage within the single instruction multiple data register file 12 may be divided in different ways to form different registers depending upon the register size specifiers utilized. The form of the single instruction multiple data register file 12 may be that of the Neon register file supported in some implementations of the processors produced by ARM Limited of Cambridge, England.

General purpose register renaming and score boarding circuitry 16 is associated with the general purpose register file 10 and single instruction multiple data register renaming and score boarding circuitry 18 is associated with the single instruction multiple data register file 12. Register renaming and score boarding are in themselves known techniques which will be familiar to workers in this technical field and will not be described further herein. The register renaming and score boarding may be applied to the registers utilized in the support of the cryptographic processing instructions described further below in the same way that they are provided for normal single instruction multiple data processing instructions. Thus, the mechanisms already provided for supporting register renaming, instruction scheduling, instruction issue, instruction retirement and instruction interrupt may be reused by the cryptographic support program instructions and accordingly the operation of these cryptographic support instruction may be better integrated with the overall operation of the central processing unit 4.

Program instructions I are received from the memory 6 and passed to an instruction pipeline 20. An instruction decoder 22 decodes the program instructions and generates control signal which control the operation of the register files 8, 12 and the processing circuitry 10, 14 as well as other elements within the central processing unit 4. Interrupt circuitry 24 is responsive to externally generated interrupt signals int to interrupt processing currently being performed by the central processing unit 4 and initiate executing of interrupt handling code as will be familiar to those in this technical field. It will be appreciated that the central processing unit 4 will typically include many additional circuit elements and these have been omitted from FIG. 1 for the sake of clarity.

Figure 2:
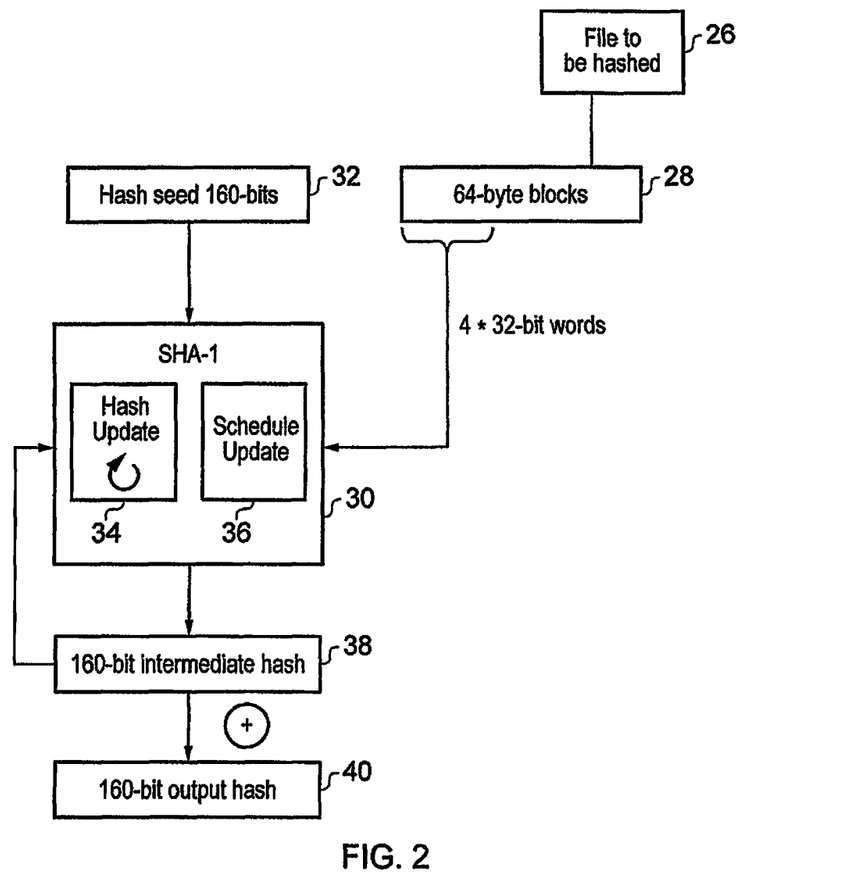
FIG. 2 schematically illustrates the data flow within one example form of a hash algorithm.

FIG. 2 schematically illustrates the data flow within one form of hash generation algorithm. A file 26 to be hashed is divided into 64-byte blocks 28 which are further divided into input vectors of four 32-bit words supplied as one input to a hash algorithm 30. A hash seed value 32 is also provided at the start of the hashing operation. The hashing operation employs two main program loops that are respectively responsible for the hash update 34 and the schedule update 36. These main loops are balanced by the provision of special purpose program instructions supporting both loops within the single instruction multiple data processing circuitry 14. Intermediate hash values 38 are generated by the hash update loop 34 and are feedback as the hash algorithm continues to process a block 28 of input data. When the block 28 has been processed (e.g. subject to 80 hash updates iterations in the case of SHA-1), then the output hash value 40 is updated by adding into it the current intermediate hash value 38. This process is repeated until all of the file 26 has been consumed. This generates the result hash value for the file 26 as a whole.

The hash update loop 34 will be executed many times and itself executes instructions which each have their own intra-instruction iterations as will be described below. The schedule update 36 is performed so as to balance the hash update. The schedule update may be vectorized to improve performance as will be described below.

Figure 3:
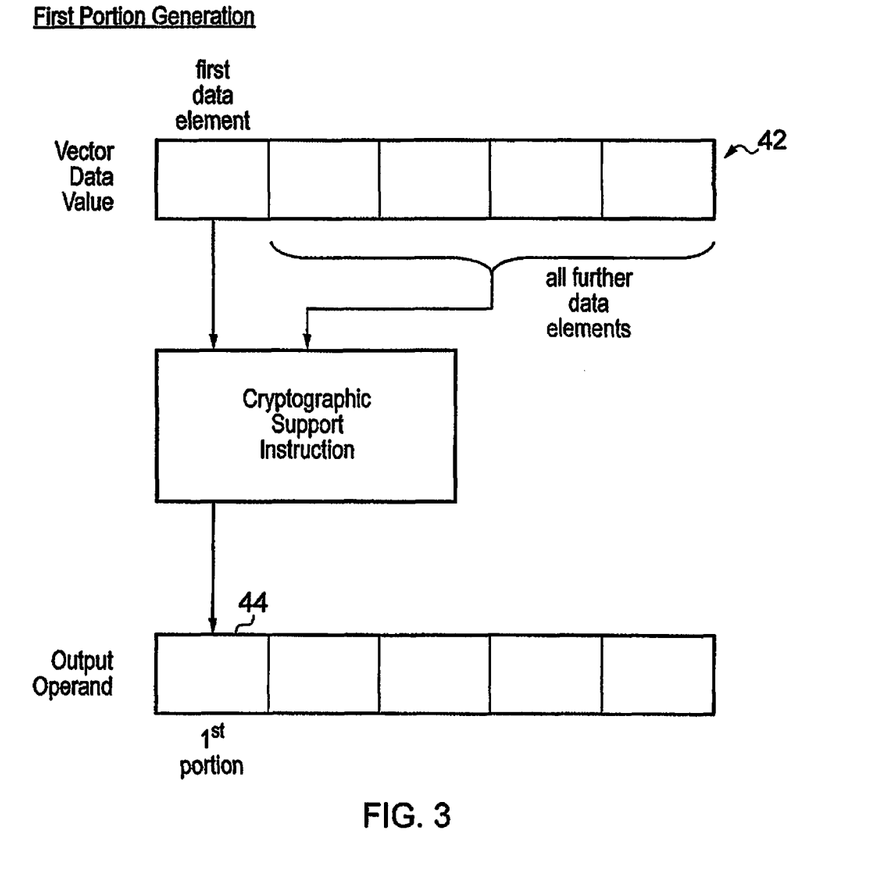
FIG. 3 schematically illustrates how the further processing instruction does not follow the normal lane-based processing associated with single instruction multiple data processing circuitry.

FIG. 3 schematically illustrates how a further processing instruction in accordance with the present techniques receives a vector data value 42 comprising a plurality data elements. The cryptographic support instruction then performs a processing operation upon this vector data value 42 to generate an output operand having a first portion 44 which depends both upon the first data element of the vector data value 42 and two or more further data elements within the vector data value. This behaviour contrasts with typical single instruction multiple data program instructions in which the processing operations are lane-based and there is limited, if any interaction, between the data values within different lanes.

One implementation of this technique is a set of instructions that target two algorithms namely SHA-1 and SHA-256. The instructions also benefit the SHA-224 algorithm which requires the same operations as SHA-256. The SHA algorithms are a family of secure hash algorithms specified by the National Institute of Standards and Technology (NIST). The specifications of these algorithms are openly available. The algorithms are typically used for authentication of data within digital systems.

We start by describing the high-level operation of the SHA algorithms and including pseudo code for the SHA-1 and SHA-256 algorithms.

High-Level Operation of the SHA Algorithms (Known; FIPS 180-4)

Each of the algorithms process 64-bytes of data, and produce a hash digest; in the case of SHA-1 this is 160-bits in length and SHA-256 this is 256-bits in length. Data streams of length greater than 64-bytes are split into 64-byte blocks. Where a stream or block is less than 64-bytes in length the block is padded, as specified in FIPS (Federal Information Processing Standard) 180-4, to 64-bytes.

Unless otherwise stated, the following description of the algorithms assumes a word to be a 32-bit unsigned integer value. Words are assumed to be composed of 4 contiguous bytes of data from the block of 64-bytes in big endian form.

Both algorithms start by initializing a working hash digest. If the block of data is the first in a given data stream then the hash digest is initialized to a fixed seed value. If the block is a continuation of the data stream, the hash digest is initialized to the hash digest calculated from the previous block.

The seed values are specified in FIPS 180-4.

The algorithms expand the block using a schedule update operation. This expands the block from an initial 16 words of data into 80 words for SHA-1, and 64 words for SHA-256. The schedule update operation combines, using fixed xors, shifts and rotates, four words from the schedule to generate the next word in the expanded schedule. The initial 16 words are left unchanged in the expanded schedule.

Each word in the expanded schedule then has a key value added to it. In SHA-1 there are 4 key constants each applied to a set of 20 words from the expanded block. In SHA-256 there are 64 key constants one for each word of the expanded block. The key constants are defined in FIPS 180-4.

After the block has been expanded and key constants have been added, each word is processed using a hash update function that incorporates that word, through a series of fixed xors, shifts and rotates, into the hash digest.

Finally after each word from the expanded block has been processed using the hash update function, the hash digest is added to the previous hash digest value.

As specified in FIPS 180-4, the schedule can be implemented as either a set of 80/64 words (SHA-1/SHA-256) or as circular queue of 16 words.

For completeness pseudo-code algorithms for SHA-1 and SHA-256, assuming a circular queue, are given below.

```
SHA-1 algorithm pseudo code
uint32 w[0:15] = 16 4-bytes (big-endian) input[ ];
uint32 wk[0:15] = w[0:15] + k[0:15];
uint32 a:e = io->hashes[0:4];
for round=0:63 {
hash_update(round,wk[round]);
w[round] = schedule_update(round,w);
wk[round ] = w[round] + k[round];
}
for round=64:79
hash_update(round,w[round]);
io->hashes[0:4] += a:e;
The SHA-1 hash update code being as follows:
hash_update(int round, uint32 wk) {
e += FN( round,b,c,d) + ROL(a,5) + wk;
b = ROL(b,30);
rotate (a,b,c,d,e) to (e,a,b,c,d)
}
where:
if round < 20, FN = choose(b,c,d);
else if round < 40, FN = parity(b,c,d);
else if round < 60, FN = majority(b,c,d);
else FN = Parity(b,c,d);
choose(b,c,d) = (((c ^ d) & b) ^ d)
parity(b,c,d) = (b ^ c ^ d)
majority(b,c,d) = (b & c) | ((b | c) & d)
The SHA-1 schedule update code being as follows:
uint32 schedule_update(int round, uint32 *w) {
return ROR(w[round−3] ^ w[round−8] ^ w[round−14] ^ w[round−16], 31);
}
SHA-256 algorithm pseudo code
uint32 a:h = io->hashes[0:7];
uint32 w[0:15] = 16 4-bytes (big-endian) input[0:63];
uint32 wk[0:15] = w[0:15] + k[0:15];
for round=0:47 {
hash_update(wk[round]);
w[round] = schedule_update(round,w);
wk[round] = w[round] + k[round];
}
for round=48:63
hash_update(wk[round]);
io->hashes[0:7] += a:h;
The SHA-256 hash update code being as follows:
hash_update(uint32 wk) {
t = h + Sigma1(e) + Choose(e,f,g) + wk;
d += t;
h = t + Sigma0(a) + Majority(a,b,c);
rotate (a,b,c,d,e,f,g,h) to (h,a,b,c,d,e,f,g);
}
where:
Sigma0(x) = ror(x,2) ^ ror(x,13) ^ ror(x,22);
Sigma1(x) = ror(x,6) ^ ror(x,11) ^ ror(x,25);
Choose(b,c,d) = (((c ^ d) & b) ^ d)
Majority(b,c,d) = ((b & c) | ((b | c) & d)
Similarly the SHA-256 schedule update pseudo code is as follows:
uint32 schedule_update(int round, uint32 *w) {
return w[round] + sigma1(w[round−2]) + w[round−7] + sigma0(w[round−15]);
}
where:
sigma0(x) = ror(x,7) ^ ror(x,18) ^ shr(x,3);
sigma1(x) = ror(x,17) ^ ror(x,19) ^ shr(x,10);
```

SHA Algorithm Working State (can be Derived from the FIPS 180-4 Specification)

One aspect of the SHA algorithms that constrains the approach taken to accelerate them is the amount of working state required to process a block of data (as described previously). The capability of a single instruction multiple data register file to hold and manipulate this state addresses this constraint.

The following table outlines the state requirements for SHA-1 and SHA-256.

| SHA-1 state | |
|---|---|
| Initial/previous hash digest | 5 × 32-bit words |
| Working hash digest | 5 × 32-bit words |
| Schedule | 16 × 32-bit words |
| Key constants | 4 × 32-bit words |
| SHA-256 state | |
| Initial/previous hash digest | 8 × 32-bit words |
| Working hash digest | 8 × 32-bit words |
| Schedule | 16 × 32-bit words |
| Key constants | 64 × 32-bit words |

Building a dedicated SHA unit (e.g. as a coprocessor), capable of processing a block of data, using either the SHA-1 or SHA-256 algorithm, requires an investment in fixed purpose state. This state could not easily be used by other operations on a RISC microprocessor.

Breaking the SHA Algorithms into Triadic Form RISC Instructions

In order to avoid fixed purpose state we have split the algorithms in such a way that they can be processed on a RISC microprocessor observing the triadic instruction form and using a single instruction multiple data processing circuitry and register file.

A typically constraint of the RISC triadic form is that only one of the three registers is defined as a destination. The destination can however be used as a source.

We use SIMD registers so that we can process more data per instruction than it would be possible using general purpose registers.

By observing the triadic instruction form, the instructions are able to use rename, scheduling, issue, result and retire logic; common to modern microprocessors.

As all state and dependencies are defined by the instructions, the pipeline mechanisms dealing with out-of-order execution, interruption and speculation are still valid; no additional control logic is required to maintain correct execution of the proposed instructions.

SHA-1 Hash Update Instructions

The SHA-1 hash update function, as previously described, incorporates a 32-bit word into a 160-bit hash digest. The function is composed of fixed shifts, fixed xors/and/ors and fixed rotates.

```
hash_update(int round, uint32 wk) {
e += FN( round,b,c,d) + ROL(a,5) + wk;
b = ROL(b,30);
rotate (a,b,c,d,e) to (e,a,b,c,d)
}
where:
if round < 20, FN = choose(b,c,d);
else if round < 40, FN = parity(b,c,d);
else if round < 60, FN = majority(b,c,d);
else FN = Parity(b,c,d);
choose(b,c,d) = (((c ^ d) & b) ^ d)
parity(b,c,d) = (b ^ c ^ d)
majority(b,c,d) = (b & c) | ((b | c) & d)
```

The SHA-1 hash digest is 160-bits and therefore operations working on the whole digest plus the 32-bit word are not possible in 32-bit general purpose triadic RISC forms and would require significant effort to realize in 64-bit general purpose triadic RISC form; more housekeeping would be required to insert a 32-bit data value into the high 32-bits of the third 64-bit operand.

For this reason this example technique maps the SHA-1 hash function onto a set of four advanced SIMD instructions; SHA1C, SHA1P, SHA1M and SHA1H.
SHA1C Qd, Sn, Vm.4S [OP=C, OP_FUNC=choose]
SHA1P Qd, Sn, Vm.4S [OP=P, OP_FUNC=parity]
SHA1M Qd, Sn, Vm.4S [OP=M, OP_FUNC=majority]
SHA1H Sd, Sn The instructions SHA1C, SHA1P and SHA1M take three operands. Qd holds the first 4 32-bit words of the digest hash, with Sn holding the $5^{th}$. The third operand, Vm, is a vector which in the initial embodiment holds four 32-bit words. This allows 4 iterations of the hash update function to be processed by the instruction. Pseudo code define the operation of these instructions is given below. It will be appreciated that defining the operation of an instruction in terms of pseudo code will be familiar to those in this technical field and the realisation of circuitry to perform (execute) the instruction defined by the pseudo code is routine once the pseudo code has been defined.

```
SHA1<OP> Qd, Sn, Vm.4S
 X = Qd;
 Y = Sn;
 for (i = 0 to 3)
 {
   Index     = (i * 32);
   t1<31:0>  = OP_FUNC(X<63:32>, X<95:64>, X<127:96>);
   Y         = Y + ROL(X<31:0>, 5) + t1<31:0> + Vm<(index +
               31):index>;
   X<63:32>  = ROL(X<63:32>, 30);
   // Rotate
   t2<31:0>  = Y;
   Y         = X<127:96>;
   X<127:0>  = {X<95:0>:t2<31:0>};
 }
 Qd = X;
```

Accordingly, in accordance with an example embodiment the single instruction multiple data processing circuitry is configured to be controlled by a further program instruction that has a first input operand Qd[127:0] and a second input operand Sn[31:0] both read from said single instruction multiple data register file and said vector data value comprises Vm[Index+31:Index] where Index is 0 to $2^N$, where N is a positive integer, said further processing operation producing said output operand $Qd_{output}[127:0]$ to have a value the same as given by the steps:

```
X[127:0] = Qd[127:0];
Y[31:0] = Sn[31:0];
for (I = 0 to (2^N–1));
    {
        Index = (I*32);
        t1[31:0] = OP FUNC (X[63:32], X[95:64], X[127:96]);
        Y[31:0] = Y[31:0] + ROL(X[31:1], 5) + T1[31:0] +
           Vm[Index+31:Index];
        X[63:32] = ROL(X[63:32], 30);
        T2[31:0] = Y[31:0];
        Y[31:0] = X[127:96];
        X[127:0] = {X[95:0]:T2[31:0]}
    }
Qd_output[127:0] = X[127:0];
```
where OP FUNC (B, C, D) is one of: ((((C XOR D) AND B) XOR D); (B XOR C XOR D); and (B AND C) OR ((B OR C) AND D); and ROL (P, Q) is a left rotate of value P by Q bit positions.

Another realization of these instructions could involve a select for choosing amongst the choose( ) parity( ) and majority( ) functions:

SHA1HASH Qd, Sn, Vm.4S, #OP//#OP where #1 selects C, #2 selects P, #3 selects M.

A constraint of the RISC instruction form is that only the first 4 words of the hash digest can be returned by the SHA1C, SHA1P and SHA1M instructions, into the 128-bit register Qd. Therefore an instruction SHA1H is proposed to return the $5^{th}$ word of the hash digest.

In the initial realization SHA1H is implemented as:
SHA1H Sd, Sn
   Sd=ROR(Sn, 2);

The follows the observation the $5^{th}$ hash digest value after four iterations is a rotation on the initial value of Qd[0].

SHA1 Hash Update Instruction Variants

Variants of the SHA1C, SHA1P and SHA1M instructions could be extended by other variants of the present techniques to allow Vm.8S or Vm.16S operands. These variant are included within the present techniques. This would allow 8 and 16 iterations of the hash update function to be processed within a single instruction. That said, the Vm.4S variant would still be required as the hash update function is required to change after every 20 iterations.

As an example the SHA1<OP> Vm.8S variant:

```
SHA1<OP> Qd, Sn, Vm.8S
 X = Qd;
 Y = Sn;
 for (i = 0 to 7)
 {
   Index     = (i * 32);
   t1<31:0>  = OP_FUNC(X<63:32>, X<95:64>, X<127:96>);
   Y         = Y + ROL(X<31:0>, 5) + t1<31:0> + Vm<(index +
               31):index>;
   X<63:32>  = ROL(X<63:32>, 30);
   // Rotate
   t2<31:0>  = Y;
   Y         = X<127:96>;
   X<127:0>  = {X<95:0>:t2<31:0>};
 }
 Qd = X;
```

The variants operating over 8 and 16 iterations (Vm.8S and Vm.16S) would additionally require SHA1C2, SHA1P2 and SHA1M2 instructions. These would produce the appropriate value for the $5^{th}$ word in the hash digest after 8 or 16 iterations. These new instructions, would be implemented in a similar manner to the SHA1C, SHA1P and SHA1M instructions, but returning the $5^{th}$ hash digest word in the Qd register, for example:

```
SHA1<OP> 2 Qd, Sn, Vm.8S
 X = Qd;
 Y = Sn;
 for (i = 0 to 3)
 {
   Index     = (i * 32);
   t1<31:0>  = OP_FUNC(X<63:32>, X<95:64>, X<127:96>);
   Y         = Y + ROL(X<31:0>, 5) + t1<31:0> + Vm<(index +
               31):index>;
   X<63:32>  = ROL(X<63:32>, 30);
   // Rotate
   t2<31:0>  = Y;
   Y         = X<127:96>;
   X<127:0>  = {X<95:0>:t2<31:0>};
 }
 Qd = {0:Y<31:0>};
```

Accordingly, in accordance with an example embodiment the single instruction multiple data processing circuitry is configured to be controlled by a further program instruction that has a first input operand Qd[127:0] and a second input operand Sn[31:0] both read from said single instruction multiple data register file and said vector data value comprises Vm[Index+31:Index] where Index is 0 to $2^N$, where N is a positive integer, said further processing operation producing said output

```
operand Qd_output[127:0] to have a value the same as given by the steps:
X[127:0] = Qd[127:0];
Y[31:0] = Sn[31:0];
for (I = 0 to (2^N–1));
    {
        Index  = (I * 32);
        T1[31:0] = OP_FUNC(X[63:32], X[95:64], X[127:96]);
        Y      = Y + ROL(X[31:0], 5) + T1[31:0] +
        Vm[(Index + 31):Index];
        X[63:32] = ROL(X[63:32], 30);
        T2[31:0] = Y;
        Y      = X[127:96];
        X[127:0] = {X[95:0]:T2[31:0]};
    }
Qd_output[127:0] = {0:Y[31:0]};
``` where OP FUNC (B, C, D) is one of: (((C XOR D) AND B) XOR D); (B XOR C XOR D); and (B AND C) OR ((B OR C) AND D); and ROL (P, Q) is a left rotate of value P by Q bit positions.

Other variants of the instruction could be realized that return the whole hash digest into a oct-word (8×32-bits) if a wider SIMD datapath were available:

SHA1<OP> Od, Vn.4S
SHA1<OP> Od, Vn.8S

These instructions would process 4 and 8 iterations of the hash function.

SHA1 Hash Update Micro-Architecture Options

Various options exist for the micro-architectural implementation of these instructions:

High performance realizations of these instructions may choose to build out some of iteration logic and perform more parallelised execution.

The micro-architecture could choose to employ multi-cycle stages to reduce temporary pipeline state and hence power consumption.

Intermediate arithmetic can be done in carry save form.

In wider variants, where explicit SHA1<OP>2 instructions may be required, it may be possible to detect when a SHA1<OP>2 operation follows a corresponding SHA1<OP> function. In those cases it should be possible to prevent the second calculation and simply forward the result from the datapath. This will require some temporary state in the pipeline.

SHA1 Schedule Update Instructions

Realizing a speed-up from the SHA-1 algorithm requires a balance between the hash update and schedule update functions.

The SHA-1 schedule update function, as previously described, combines four 32-bit words from the data schedule into a single resulting word that expands the schedule, or in the case of a circular queue, overwrites a word in the schedule.

The schedule update operation consists of xors and a fixed rotate.

```
uint32 schedule_update(int round, uint32 *w) {
return ROR(w[round–3] ^ w[round+8] ^ w[round–14] ^ w[round–16], 31);
}
``` or in the circular queue form:

```
void schedule_update(int round, uint32 w[0..15]) {
    w[round] = ROR(w[round+13_mod16] ^ w[round+8_mod16] ^
    w[round+2_mod16] ^ w[round], 31);
}
```

The operation requires four input values, one of them being destructive. This does not fit the general purpose 32-triadic RISC form.

The schedule update instructions may be provided by the ARM advanced SIMD architecture. To avoid memory loads and stores we opted to implement instructions that efficiently execute the circular queue form of the schedule update, described in FIPS 180-4.

For completeness we include the vectorization method for the schedule update.

SHA-1 Schedule Update Vectorization and Substitution

This follows the observation that w[round], w[round+ $1_{mod\ 16}$] and w[round+$2_{mod\ 16}$] can be processed in parallel. There is a dependence on w[round] in the calculation of w[round+$3_{mod\ 16}$] that prevents a direct route to four-way vectorisation.

w[round]=ROR(w[round+13]^w[round+8]^w[round+2]^w[round]), 31);
w[round+1]=ROR(w[round+14]^w[round+9]^w[round+3]^w[round+1]), 31);
w[round+2]=ROR(w[round+15]^w[round+10]^w[round+4]^w[round+2]), 31);
w[round+3]=ROR(w[round]^w[round+11]^w[round+5]^w[round+3]), 31);

This restriction can be overcome by substituting zero in for the value of w[round] in the calculation of w[round+$3_{mod\ 16}$], and fixing up the result with an additional xor and rotate step; this is illustrated below.

w[round]=ROR(w[round+13]^w[round+8]^w[round+2]^w[round]), 31);
w[round+1]=ROR(w[round+14]^w[round+9]^w[round+3]^w[round+1]), 31);
w[round+2]=ROR(w[round+15]^w[round+10]^w[round+4]^w[round+2]), 31);
w[round+3]=ROR(0^w[round+11]^w[round+5]^w[round+3]), 31);
w[round+3]=w[round+3]^ROR(w[round], 31);

The above block of code can be re-factored to make use of 4-lane vector operations on a SIMD architecture with a datapath size of 4×32-bits.

SHA-1 Schedule Update and Hash Update Balancing

To balance the schedule update operations with the hash update operations the schedule update is processed as previously described, i.e. using four-way vectorisation. This allows a single schedule update to produce sufficient data, 4×32-bit words, for the subsequent hash function instructions.

The vectorization technique will, in reasonable SIMD implementations, take more execution cycles to compute the schedule data than those taken to execute the proposed SHA-1 hash functions.

There are a number of reasons for this:

The vector containing elements {round+2, round+3, round+4, round+5} will probably span two vector registers.

The vector containing elements {round+13, round+14, round+15, 0} would need to be extracted from one vector register and a zero vector.

SIMD vector rotates are not commonly found in SIMD instructions sets e.g. ARM advanced SIMD.

So a vector rotate requires a two vector shifts and an or instruction.

Due to Amdahl's law, both parts of the SHA-1 algorithm should be balanced otherwise the slower part will limit the amount of speed up achievable.

This observation led to the following SIMD instructions for accelerating the SHA-1 schedule update function.

SHA1SU0 Vd.4S, Vn.4S, Vm.4S
T<127:0>=Vn<63:0>:Vd<127:64>
Vd=T XOR Vd XOR Vm

SHA1SU1 Vd.4S, Vn.4S
    T<127:0>=Vd XOR {32{0}:Vn<127:32>};
    Vd<95:0>=T<94:64>:T<95>:T<62:32>:T<63>:T<30:
        0>:T<31>;
    Vd<127:96>=(T<126:96>:T<127>) XOR (T<29:0>:
        T<31:30>);

The instructions assume that the circular queue resides in four 4×32-bit vector registers.

The reordering of elements is pulled inside the instructions. This effectively makes the reordering of elements free, they are just wires in the micro-architecture.

The fixed rotates are also just wires.

The instructions are balanced and may have very low cycle latencies in most micro-architectures;

they comprise two xors in serial and wiring.

Accordingly, in accordance with an example embodiment the single instruction multiple data processing circuitry is configured to be controlled by a first schedule instruction having a first input operand Sp[127:0] and a second input operand Sq[127:0] and generating an output operand Sr[127:0] with a value the same as given by the steps:
T[127:0]={Sp[63:0]:Sq[127:64]} and
Sr[127:0]=T[127:0] XOR Sr[127:0] XOR Sq[127:0].

Instructions Targeting the SHA-2 Algorithms

Many of the features outlined in the discussion of the instructions proposed for the SHA-1 algorithms apply equally to the SHA-2 algorithms. This section will describe differences in the instructions proposed for the SHA-2 algorithms.

SHA-2 Hash Update Instructions

For the reasons outlined for SHA-1 the SHA-2 hash update functions are targeted by two hash update instructions.

The working hash digest for SHA-2 algorithms is either 256- or 512-bits. The following focuses on the algorithms SHA-256 and SHA-224 which have a working hash of 256-bits, as these are included in the initial realization of the invention. In a later section it is discussed how the present techniques apply to SHA-512, SHA-384, SHA-512/256 and SHA-512/224.

SHA-256 Hash Update Instructions

The working hash digest of SHA-256 (and SHA-224) is 256-bits long. In a SIMD architecture with a register width of 128-bits the result of any operation on the hash digest requires two instructions; one to return the first 4×32-bit words and the second to return the remaining 4×32-bit words.

The SHA-2 hash update functions, unlike SHA-1, are fixed and do not change after a given number of iterations therefore we only need two instructions.

```
SHA256H    Qd, Qn, Vm.4S
    X = Qd;
    Y = Qn;
    for (i = 0 to 3)
    {
        index      = (i * 32);
        tCh<31:0>  = Choose(Y<31:0>, Y<63:32>, Y<95:64>);
        tMaj<31:0> = Majority(X<31:0>, X<63:32>, X<95:64>);
        t1<31:0> = Y<127:96> + Sigma1(Y<31:0>) +
              tCh<31:0> + Vm<(index + 31):index>;
        X<127:96>  = t1<31:0> + X<127:96>;
        Y<127:96>  = t1<31:0> + Sigma0(X<31:0>) + tMaj<31:0>;
        t2<31:0>   = Y<127:96>;
        Y<127:0>   = Y<95:0>:X<127:96>;
        X<127:0>   = X<95:0>:t2<31:0>;
    }
    Qd = X;
```

Accordingly, in accordance with an example embodiment the single instruction multiple data processing circuitry is configured to be controlled by a further program instruction that has a first input operand Qd[127:0] and a second input operand Qn[127:0] both read from said single instruction multiple data register file and said vector data value comprises Vm[Index+31:Index] where Index is 0 to $2^N$, where N is a positive integer, said further processing operation producing said output operand $Qd_{output}$[127:0] to have a value the same as given by the steps:

```
X[127:0] = Qd[127:0];
Y[127:0] = Qn[127:0];
for (I = 0 to (2^N-1));
{
    Index = (I*32);
    TCh[31:0] = Choose(Y[31:0], Y[63:32], Y[95:64]);
    TMaj[31:0] = Majority(X[31:0], Y[63:32], Y[95:64]);
    T1[31:0] = Y[127:96] + Sigma1(Y[31:0]) + TCh[31:0] +
        Vm[Index+31:Index];
    X[127:96] = T1[31:0] + X[127:96];
    Y[127:96] = T1[31:0] + Sigma0(X[31:0]) + TMaj[31:0]
    T2[31:0] = Y[127:96];
    Y[127:0] = {Y[95:0]:X[127:96]};
    X[127:0] = {X[95:0]:T2[31:0]}
}
Qd_output[127:0] = X[127:0];
where Choose(B, C, D) is ((((C XOR D) AND B) XOR D),
Majority(B, C, D) is ((B AND C) OR ((B OR C) AND D)),
Sigma0(B) is (ROR(B,2) XOR ROR(B, 13) XOR ROR(B, 22)),
Sigma1(B) is (ROR(B,6) XOR ROR(B, 11) XOR ROR(B, 25))
and ROR (P, Q) is a right rotate of value P by Q bit positions.
SHA256H2    Qd, Qn, Vm.4S
    X = Qn;
    Y = Qd ;
    for (i = 0 to 3)
    {
        index      = (i * 32);
        tCh<31:0>  = Choose(Y<31:0>, Y<63:32>, Y<95:64>);
        tMaj<31:0> = Majority(X<31:0>, X<63:32>, X<95:64>);
        t1<31:0> = Y<127:96> + Sigma1(Y<31:0>) +
              tCh<31:0> + Vm<(index + 31):index>;
        X<127:96>  = t1<31:0> + X<127:96>;
        Y<127:96>  = t1<31:0> + Sigma0(X<31:0>) + tMaj<31:0>;
        t2<31:0>   = Y<127:96>;
        Y<127:0>   = Y<95:0>:X<127:96>;
        X<127:0>   = X<95:0>:t2<31:0>;
}
Qd = Y;
```

Accordingly, in accordance with an example embodiment the single instruction multiple data processing circuitry is configured to be controlled by a further program instruction that has a first input operand Qd[127:0] and a second input operand Qn[127:0] both read from said single instruction multiple data register file and said vector data value comprises Vm[Index+31:Index] where Index is 0 to $2^N$, where N is a positive integer, said further processing operation producing said output operand $Qd_{output}$[127:0] to have a value the same as given by the steps:

```
X[127:0] = Qn[127:0];
Y[127:0] = Qd[127:0];
for (I = 0 to (2^N-1));
{
    Index = (I*32);
    TCh[31:0] = Choose(Y[31:0], Y[63:32], Y[95:64]);
    TMaj[31:0] = Majority(X[31:0], Y[63:32], Y[95:64]);
    T1[31:0] = Y[127:96] + Sigma1(Y[31:0]) + TCh[31:0] +
        Vm[Index+31:Index];
    X[127:96] = T1[31:0] + X[127:96];
    Y[127:96] = T1[31:0] + Sigma0(X[31:0]) + TMaj[31:0]
    T2[31:0] = Y[127:96];
```

```
        Y[127:0] = {Y[95:0]:X[127:96]};
        X[127:0] = {X[95:0]:T2[31:0]}
    }
    Qd_output[127:0] = Y[127:0];
``` where Choose(B, C, D) is (((C XOR D) AND B) XOR D), Majority(B, C, D) is ((B AND C) OR ((B OR C) AND D)), Sigma0(B) is (ROR(B,2) XOR ROR(B, 13) XOR ROR(B, 22)), Sigma1(B) is (ROR(B,6) XOR ROR(B, 11) XOR ROR(B, 25)) and ROR (P, Q) is a right rotate of value P by Q bit positions.

SHA256H expects the first 4×32-bit words of the hash digest in Qd, the remaining 4×32-bit words in Qn and the 4×32-bit words of schedule data in Vm.4S.

SHA256H2 expects the second 4×32-bit words of the hash digest in Qd, the first 4×32-bit words in Qn and the 4×32-bit words of schedule data in Vm.4S.

Note that as SHA256H destructs the first 4×32-bit words of the hash digest a copy must be taken prior to executing SHA256H so that the correct values can be passed to SHA256H2 in Qn.

SHA-256 Hash Update Instruction Variants

As previously outlined for the SHA-1 hash update instructions, variants of the SHA-256 instructions for wider vector SIMD could include the following:

SHA256(H|H2) Qd, Qn, Vm.8S
SHA256(H|H2) Qd, Qn, Vm.16S

These instructions would process 8 and 16 iterations of the hash update function respectively. A wider SIMD datapath may also allow:

SHA256H Od, Vm.8S
SHA256H Od, Vm.16S

Where Od, is a 256-bit wide register, there is no need to provide SHA256H2 operations, the entire hash digest will fit in a vector register.

SHA-256 Schedule Update

As outlined previously, for SHA-1, realizing a speed-up from the SHA-256 algorithm requires a balance between the hash update and schedule update functions.

The SHA-256 schedule update function combines four 32-bit words from the data schedule into a single resulting word that either expands the schedule, or in the case of a circular queue, overwrites a word in the schedule.

The schedule update operation consists of xors, fixed shifts and fixed rotates (known).

```
uint32 schedule_update(int round, uint32 *w) {
    return w[round] + sigma1(w[round−2]) + w[round−7] +
    sigma0(w[round−15]);
}
``` where: sigma0(x) = ror(x,7) ^ ror(x,18) ^ shr(x,3); sigma1(x) = ror(x,17) ^ ror(x,19) ^ shr(x,10);

This can also be expressed in a circular queue (known):

```
void schedule_update(int round, uint32 *w) {
    w[round] = sigma1(w[round+14_mod16]) + w[round+9_mod16] +
    sigma0(w[round+1_mod16]);
}
```

SHA-256 Schedule Update Vectorization and Substitution

The SHA-256 schedule update function can also be vectorized, in a manner suitable for 4-way SIMD.

w[round]=sigma1(w[round+14])+w[round+9]+sigma0(w[round+1]);
w[round+1]=sigma1(w[round+15])+w[round+10]+sigma0(w[round+2]);
w[round+2]=sigma1(w[round])+w[round+11]+sigma0(w[round+3]);
w[round+3]=sigma1(w[round+1])+w[round+12]+sigma0(w[round+4]);

Note that two dependencies exist, namely w[round] and w[round+1]. The substitution method for the SHA-256 works as before by substituting in zero values and then fixing up the results. This method is illustrated below:

w[round]=sigma1(w[round+14])+w[round+9]+sigma0(w[round+1]);
w[round+1]=sigma1(w[round+15])+w[round+10]+sigma0(w[round+2]);
w[round+2]=sigma1(w[0])+w[round+11]+sigma0(w[round+3]);
w[round+3]=sigma1(w[0])+w[round+12]+sigma0(w[round+4]);
w[round+2]+=sigma1(w[round]);
w[round+3]+=sigma1(w[round]);

The above block of code can be re-factored to make use of 4-lane vector operations on a SIMD architecture with a datapath size of 4×32-bits.

SHA-256 Schedule Update and Hash Update Balancing

To balance the schedule update operations with the hash update operations we propose processing the schedule update as previously described, i.e. using four-way vectorisation. This allows a single schedule update to produce sufficient data, 4×32-bit words, for the subsequent hash function instructions.

The vectorization technique will, in reasonable SIMD implementations, take more execution cycles to compute the schedule data than those taken to execute the proposed SHA-1 hash functions.

There are a number of reasons for this:

The vectors containing elements {round+1, round+2, round+3, round+4} and {round+9, round+10, round+11, round+12} will span more than one vector register.

The register containing {round+14, round+15, 0, 0} will need to be composed using extraction.

The sigma operations contain rotates and SIMD vector rotates are not commonly found in SIMD instructions sets e.g. ARM advanced SIMD. A vector rotate in such architectures requires two vector shifts and an OR instruction.

The fix-up to account for the substitution will also require extraction of the registers.

The sigma0 and sigma1 operation consist of around 7 vector operations.

Due to Amdahl's law both parts of the SHA-256 algorithm need to be balanced in order to prevent the slower part from limiting the amount of speed up achievable.

These observations led to the following SIMD instructions for accelerating the SHA-256 schedule update function.

SHA256SU0 Vd.4S, Vn.4S
    T<127:0>=Vn<31:0>:Vd<127:32>
    T<127:0>=VecROR32(T, 7) XOR VecROR32(T, 18) XOR
        VecSHR32(T, 3)
    Vd=VecADD32(T, Vd)
SHA256SU1 Vd.4S, Vn.4S, Vm.4S
    T0<127:0>=Vm<31:0>:Vn<127:32>
    T1<63:0>=Vm<127:64>
    T1<63:0>=VecROR32(T1<63:0>,17) XOR VecROR32
        (T1<63:0>,19) XOR
VecSHR32(T1<63:0>,10)
    T1<63:0>=VecADD32(Vd<63:0>,T0<63:0>)
    T1<63:0>=VecADD32(T3<63:0>, T1<63:0>)
    T2<63:0>=VecROR32(T1<63:0>,17) XOR VecROR32
        (T1<63:0>,19) XOR
```

VecSHR32(T1<63:0>,10)
   T3<63:0>=VecADD32(Vd<127:64>,T0<127:64>)
   Vd=VecADD32(T3<63:0>,T2<63:0>):T1<63:0>

The instructions assume that the circular queue resides in four 4×32-bit vector registers. The instructions do not preclude the use of schedule expansion.

The reordering and extraction of elements is pulled inside the instructions. The micro-architecture can then choose to implement these and the fixed shift and rotates as wiring.

The instructions may have low cycle latencies in most micro-architectures.

Accordingly, in accordance with an example embodiment the single instruction multiple data processing circuitry is configured to be controlled by a first schedule instruction having an input operand Sp[127:0] and generating an output operand Sq[127:0] with a value the same as given by the steps:

T[127:0]={Sp[31:0]:Sq[127:32]};
T[127:0]=VecROR32(T[127:0], 7) XOR VecROR32(T[127:0], 18) XOR VecROR32(T[127:0], 3);
and
Sq[127:0]=VecADD32(T[127:0], Sq[127:0]),
where VecROR32(A, B) is a separate right rotate by B bit positions of each 32-bit word within A and VecADD32(A, B) is a separate addition of each 32-bit word within A to a corresponding 32-bit word within B.

Accordingly, in accordance with an example embodiment the single instruction multiple data processing circuitry is configured to be controlled a second schedule instruction by having a first input operand Sp[127:0] and a second input operand Sq[127:0] and generating an output operand Sr[127:0] with a value the same as given by the steps:

T0[127:0]={Sq[31:0]:Sp[127:32]};
T1[63:0]=Sq[127:64];
T1[63:0]=VecROR32(T1[63:0], 17) XOR VecROR32(T1[63:0], 19) XOR VecROR32(T1[63:0], 10);
T3[63:0]=VecADD32(Sr[63:0], T0[63:0]);
T1[63:0]=VecADD32(T3[63:0], T1[63:0]);
T2[63:0]=VecROR32(T1[63:0], 17) XOR VecROR32(T1[63:0], 19) XOR VecROR32(T1[63:0], 10);
T3[63:0]=VecADD32(Sr[127:64], T0[127:64]); and
Sr[127:0]={VecADD32(T3[63:0], T2[63:0]):T1[63:0]},
where VecROR32(A, B) is a separate right rotate by B bit positions of each 32-bit word within A and VecADD32(A, B) is a separate addition of each 32-bit word within A to a corresponding 32-bit word within B.

Differences Between SHA-256 and SHA-512

The SHA-512 algorithms are very similar to the SHA-256 algorithm. The same approach, outlined in the section describing support for SHA-256 can equally be applied to SHA-512, with the following small differences:

The input data is split into blocks of 128-bytes, and processed as 16×64-bit words in big-endian form.
SHA-512 works on 8×64-bit words
SHA-512 requires 80 iterations of the hash function.

The hash functions and schedule update work on 64-bit words and contain different fixed shifts, rotates, and xors.

For brevity we omit the SHA-512 algorithm.
Instructions Targeting the SHA-512, SHA-384, SHA-512/256 and SHA-512/256 Algorithms.

The motivation for the instructions targeting SHA-256 hold equally for the SHA-512 algorithms. We list possible realizations of these instructions targeting SHA-512.

Where the SIMD registers are 128-bits, and assuming 4 iterations per hash and schedule instructions:
SHA512H {Qd, Qd+1}, {Qn, Qn+1}, {Vm.2D, Vm+1.2D}
SHA512H2 {Qd, Qd+1}, {Qn, Qn+1}, {Vm.2D, Vm+1.2D}
SHA512SU0 {Vd.2D, Vd+1.2D}, {Vn.2D, Vn+1.2D}
SHA512SU1 {Vd.2D, Vd+1.2D}, {Vn.2D, Vn+1.2D}, {Vm.2D, Vm+1.2D}

Note that the above instruction would likely require register pinning; specifying one register and implying a second register, within the micro-architecture. The instruction would no longer fall into the typical RISC triadic form, however there is precedence for these type of operations, e.g. in the Neon load/store multiple instructions of ARM Limited.

Where wider SIMD registers are available, possible variants of the instructions include:
SHA512H Od, On, Vm.4D
SHA512H2Od, On, Vm.4D
SHA512SU0 Vd.4D, Vn.4D
SHA512SU1 Vd.4D, Vn.4D, Vm.4D These also process for iterations of the hash and schedule update operations, but due to the wider SIMD registers fit the triadic RISC form.

Using truncation, as described in FIPS 180-4, these instructions could equally target SHA-384, SHA-512/256 and SHA-512/224.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Data processing apparatus comprising:
a single instruction multiple data register file; and
single instruction multiple data processing circuitry coupled to said single instruction multiple data register file and configured to be controlled by a single instruction multiple data program instruction to perform a processing operation independently upon separate data elements stored within separate lanes within an input operand register of said single instruction multiple data register file; wherein
said single instruction multiple data processing circuitry is configured to be controlled by a further program instruction to perform a further processing operation upon a vector data value comprising a sequence of data elements held within an input operand register of said single instruction multiple data register file to produce an output operand stored within an output operand register of said single instruction multiple data register file, said output operand having a first portion with a value dependent upon all data elements within said sequence of data elements, wherein said further program instruction is a cryptographic program instruction that operates to generate an output hash value as said output operand in dependence upon a plurality of words of data forming said vector data value.

2. Data processing apparatus as claimed in claim 1, wherein said further program instruction performs an iterative processing operation consuming successive words of data and at least portions of intermediate hash values to generate said output hash value.

3. Data processing apparatus as claimed in claim 1, wherein said further program instruction has a first input operand Qd[127:0] and a second input operand Sn[31:0] both read from said single instruction multiple data register file and said vector data value comprises Vm[Index+31:Index] where Index is 0 to $2^N$, where N is a positive integer, said further processing operation producing said output operand $Qd_{output}$[127:0] to have a value the same as given by the steps:

```
X[127:0] = Qd[127:0];
Y[31:0] = Sn[31:0];
for (I = 0 to (2^N−1));
    {
        Index = (I*32);
        t1[31:0] = OP FUNC (X[63:32], X[95:64], X[127:96]);
        Y[31:0] = Y[31:0] + ROL(X[31:1], 5) + T1[31:0] +
            Vm[Index+31:Index];
        X[63:32] = ROL(X[63:32], 30);
        T2[31:0] = Y[31:0];
        Y[31:0] = X[127:96];
        X[127:0] = {X[95:0]:T2[31:0]}
    }
Qd_output[127:0] = X[127:0];
``` where OP FUNC (B, C, D) is one of: ((((C XOR D) AND B) XOR D); (B XOR C XOR D); and (B AND C) OR ((B OR C) AND D); and ROL (P, Q) is a left rotate of value P by Q bit positions.

4. Data processing apparatus as claimed in claim 3, wherein said further program instruction includes a field selecting as OP FUNC (B, C, D) one of:

((((C XOR D) AND B) XOR D);

(B XOR C XOR D); and (B AND C) OR ((B OR C) AND D).

5. Data processing apparatus as claimed in claim 3, wherein said first input operand Qd[127:0] and said second input operand Sn[31:0] are read from separate registers within said single instruction multiple data register file.

6. Data processing apparatus as claimed in claim 3, wherein said first input operand Qd[127:0] and said second input operand Sn[31:0] are read from a shared register within said single instruction multiple data register file.

7. Data processing apparatus as claimed in claim 3, wherein said single instruction multiple data processing circuitry is configured to be controlled by a rotate instruction having an input operand Sm[31:0] and generating an output operand Sd[31:0] with a value the same as given by a right rotation of Sm[31:0] by two bit positions.

8. Data processing apparatus as claimed in claim 3, wherein said single instruction multiple data processing circuitry is configured to be controlled by a first schedule update instruction having a first input operand Sp[127:0] and a second input operand Sq[127:0] and generating an output operand Sr[127:0] with a value the same as given by the steps:

T[127:0] ={Sp[63:0]:Sq[127:64]} and

Sr[127:0] =T[127:0] XOR Sr[127:0] XOR Sq[127:0].

9. Data processing apparatus as claimed in claim 1, wherein said further program instruction has a first input operand Qd[127:0] and a second input operand Sn[31:0] both read from said single instruction multiple data register file and said vector data value comprises Vm[Index+31:Index] where Index is 0 to $2^N$, where N is a positive integer, said further processing operation producing said output operand Qd_output[127:0] to have a value the same as given by the steps:

```
X[127:0] = Qd[127:0];
Y[31:0] = Sn[31:0];
for (I = 0 to (2^N−1));
    {
        Index    = (I * 32);
        T1[31:0] = OP_FUNC(X[63:32], X[95:64], X[127:96]);
        Y        = Y + ROL(X[31:0], 5) + T1[31:0] +
            Vm[(Index + 31):Index];
        X[63:32] = ROL(X[63:32], 30);
        T2[31:0] = Y;
        Y        = X[127:96];
        X[127:0] = {X[95:0]:T2[31:0]};
    }
Qd_output[127:0] = {0:Y[31:0]};
``` where OP FUNC (B, C, D) is one of: ((((C XOR D) AND B) XOR D); (B XOR C XOR D); and (B AND C) OR ((B OR C) AND D); and ROL (P, Q) is a left rotate of value P by Q bit positions.

10. Data processing apparatus as claimed in claim 1, wherein said further program instruction has a first input operand Qd[127:0] and a second input operand Qn[127:0] both read from said single instruction multiple data register file and said vector data value comprises Vm[Index+31:Index] where Index is 0 to $2^N$, where N is a positive integer, said further processing operation producing said output operand Qd_output[127:0] to have a value the same as given by the steps:

```
X[127:0] = Qd[127:0];
Y[127:0] = Qn[127:0];
for (I = 0 to (2^N−1));
    {
        Index = (I*32);
        TCh[31:0] = Choose(Y[31:0], Y[63:32], Y[95:64]);
        TMaj[31:0] = Majority(X[31:0], Y[63:32], Y[95:64]);
        T1[31:0] = Y[127:96] + Sigma1(Y[31:0]) + TCh[31:0] +
            Vm[Index+31:Index];
        X[127:96] = T1[31:0] + X[127:96];
        Y[127:96] = T1[31:0] + Sigma0(X[31:0]) + TMaj[31:0]
        T2[31:0] = Y[127:96];
        Y[127:0] = {Y[95:0]:X[127:96]};
        X[127:0] = {X[95:0]:T2[31:0]}
    }
Qd_output[127:0] = X[127:0];
``` where Choose(B, C, D) is ((((C XOR D) AND B) XOR D), Majority(B, C, D) is ((B AND C) OR ((B OR C) AND D)), Sigma0(B) is (ROR(B,2) XOR ROR(B, 13) XOR ROR(B, 22)), Sigma1(B) is (ROR(B,6) XOR ROR(B, 11) XOR ROR(B, 25)) and ROR (P, Q) is a right rotate of value P by Q bit positions.

11. Data processing apparatus as claimed in claim 10, wherein said first input operand Qd[127:0] and said second input operand Qn[127:0] are read from separate registers within said single instruction multiple data register file.

12. Data processing apparatus as claimed in claim 10, wherein said first input operand Qd[127:0] and said second input operand Qn[127:0] are read from a shared register within said single instruction multiple data register file.

13. Data processing apparatus as claimed in claim 10, wherein said single instruction multiple data processing circuitry is configured to be controlled by a first schedule update instruction having an input operand Sp[127:0] and generating an output operand Sq[127:0] with a value the same as given by the steps:

T[127:0] ={Sp[31:0]:Sq[127:32]};

T[127:0] =VecROR32(T[127:0], 7) XOR VecROR32(T[127:0], 18) XOR VecROR32(T[127:0], 3); and Sq[127:0] =VecADD32(T[127:0], Sq[127:0]), where VecROR32(A, B) is a separate right rotate by B bit positions of each 32-bit word within A and VecADD32 (A, B) is a separate addition of each 32-bit word within A to a corresponding 32-bit word within B.

14. Data processing apparatus as claimed in claim 13, wherein said single instruction multiple data processing circuitry is configured to be controlled by a second schedule update instruction having a first input operand Sp[127:0] and a second input operand Sq[127:0] and generating an output operand Sr[127:0] with a value the same as given by the steps:

T0[127:0] ={Sq[31:0]:Sp[127:32]};

T1[63:0] =Sq[127:64];

T1[63:0] =VecROR32(T1 [63:0], 17) XOR VecROR32(T1 [63:0], 19) XOR VecROR32(T1 [63:0], 10);

T3[63:0] =VecADD32(Sr[63:0], T0[63:0]);
T1[63:0] =VecADD32(T3 [63 :0], T1 [63:0]);
T2[63:0] =VecROR32(T1[63:0], 17) XOR VecROR32(T1 [63:0], 19) XOR VecROR32(T1[63:0], 10);
T3[63:0] =VecADD32(Sr[127:64], T0[127:64]); and
Sr[127:0] ={VecADD32(T3[63:0], T2[63:0]):T1[63:0]},
where VecROR32(A, B) is a separate right rotate by B bit positions of each 32-bit word within A and VecADD32 (A, B) is a separate addition of each 32-bit word within A to a corresponding 32-bit word within B.

15. Data processing apparatus as claimed in claim 1, wherein said further program instruction has a first input operand Qd[127:0] and a second input operand Qn[127:0] both read from said single instruction multiple data register file and said vector data value comprises Vm[Index+31:Index] where Index is 0 to $2^N$, where N is a positive integer, said further processing operation producing said output operand $Qd_{output}$[127:0] to have a value the same as given by the steps:

```
X[127:0] = Qn[127:0];
Y[127:0] = Qd[127:0];
for (I = 0 to (2^N-1));
{
    Index = (I*32);
    TCh[31:0] = Choose(Y[31:0], Y[63:32], Y[95:64]);
    TMaj[31:0] = Majority(X[31:0], Y[63:32], Y[95:64]);
    T1[31:0] = Y[127:96] + Sigma1(Y[31:0]) + TCh[31:0] + Vm[Index+31:Index];
    X[127:96] = T1[31:0] + X[127:96];
    Y[127:96] = T1[31:0] + Sigma0(X[31:0]) + TMaj[31:0]
    T2[31:0] = Y[127:96];
    Y[127:0] = {Y[95:0]:X[127:96]};
    X[127:0] = {X[95:0]:T2[31:0]}
}
Qd_output[127:0] = Y[127:0];
``` where Choose(B, C, D) is (((C XOR D) AND B) XOR D), Majority(B, C, D) is ((B AND C) OR ((B OR C) AND D)), Sigma0(B) is (ROR(B,2) XOR ROR(B, 13) XOR ROR(B, 22)), Sigma1(B) is (ROR(B,6) XOR ROR(B, 11) XOR ROR(B, 25)) and ROR (P, Q) is a right rotate of value P by Q bit positions.

16. Data processing apparatus as claimed in claim 1, wherein said single instruction multiple data processing circuitry utilises common mechanism for managing processing of said further program instruction and said single instruction multiple data program instruction.

17. Data processing apparatus as claimed in claim 16, wherein said managing processing includes one or more of managing:
register renaming;
instruction scheduling;
instruction issue;
instruction retirement; and
instruction interrupt.

18. Data processing apparatus as claimed in claim 17, wherein said single instruction multiple data processing circuitry is configured to be controlled by a second schedule update instruction having an input operand Ss[127:0] and generating an output operand St[127:0] with a value the same as given by the steps:
T[127:0] =St[127:0] XOR {32{0}:Ss[127:32]};
St[95:0] ={T[94:64]:T[95]:T[62:32]:T[63]:T[30:0]:T[31]}; and
St[127:96] =({T[126:96]:T[127]}) XOR ({T[29:0]:T[31:30]}).

19. Data processing apparatus as claimed in claim 1, further comprising a general purpose register file separate from said single instruction multiple data register file, said general purpose register file having general purpose registers with a lower bit-width than registers within said single instruction multiple data register file, and general purpose processing circuitry coupled to said general purpose register file and configured to be controlled by a general purpose processing instruction to perform a processing operation upon an input operand stored within one of said general purpose registers.

20. Data processing apparatus comprising:
single instruction multiple data register file means for storing single instruction multiple data operands; and
single instruction multiple data processing means for performing a processing operation under control of a single instruction multiple data program instruction, said single instruction multiple data processing means being coupled to said single instruction multiple data register file means and said processing operation being performed independently upon separate data elements stored within separate lanes within an input operand register of said single instruction multiple data register file means; wherein
said single instruction multiple data processing means is controlled by a further program instruction to perform a further processing operation upon a vector data value comprising a sequence of data elements held within an input operand register of said single instruction multiple data register file means to produce an output operand stored within an output operand register of said single instruction multiple data register file means, said output operand having a first portion with a value dependent upon all data elements within said sequence of data elements, wherein said further program instruction is a cryptographic program instruction that operates to generate an output hash value as said output operand in dependence upon a plurality of words of data forming said vector data value.

21. A method of processing data comprising the steps of:
storing single instruction multiple data operands within a single instruction multiple data register file;
under control of a single instruction multiple data program instruction performing a processing operation independently upon separate data elements stored within separate lanes within an input operand register of said single instruction multiple data register file; and
under control of a further program instruction performing a further processing operation upon a vector data value comprising a sequence of data elements held within an input operand register of said single instruction multiple data register file to produce an output operand stored within an output operand register of said single instruction multiple data register file, said output operand having a first portion with a value dependent upon all data elements within said sequence of data elements, wherein said further program instruction is a cryptographic program instruction that operates to generate an output hash value as said output operand in dependence upon a plurality of words of data for said vector data value.

22. A method as claimed in claim 21, wherein said further program instruction has a first input operand Qd[127:0] and a second input operand Sn[31:0] both read from said single instruction multiple data register file and said vector data value comprises Vm[Index+31:Index] where Index is 0 to $2^N$, where N is a positive integer, said further processing operation producing said output operand $Qd_{output}$[127:0] to have a value the same as given by the steps:

```
X[127:0] = Qd[127:0];
Y[31:0] = Sn[31:0];
for (I = 0 to (2^N-1));
{
    Index = (I*32);
```

```
        t1[31:0] = OP FUNC (X[63:32], X[95:64], X[127:96]);
        Y[31:0] = Y[31:0] + ROL(X[31:1], 5) + T1[31:0] +
        Vm[Index+31:Index];
        X[63:32] = ROL(X[63:32], 30);
        T2[31:0] = Y[31:0];
        Y[31:0] = X[127:96];
        X[127:0] = {X[95:0]:T2[31:0]}
    }
    Qd_output[127:0] = X[127:0];
``` where OP FUNC (B, C, D) is one of: ((((C XOR D) AND B) XOR D); (B XOR C XOR D); and (B AND C) OR ((B OR C) AND D)); and ROL (P, Q) is a left rotate of value P by Q bit positions.

23. A method is claimed in claim 21, wherein said further program instruction has a first input operand Qd[127:0] and a second input operand Sn[31:0] both read from said single instruction multiple data register file and said vector data value comprises Vm[Index+31:Index] where Index is 0 to $2^N$, where N is a positive integer, said further processing operation producing said output operand Qd_output[127:0] to have a value the same as given by the steps:

```
    X[127:0] = Qd[127:0];
    Y[31:0] = Sn[31:0];
    for (I = 0 to (2^N-1));
    {
        Index    = (I * 32);
        T1[31:0] = OP_FUNC(X[63:32], X[95:64], X[127:96]);
        Y        = Y + ROL(X[31:0], 5) + T1[31:0] +
        Vm[(Index + 31):Index];
        X[63:32] = ROL(X[63:32], 30);
        T2[31:0] = Y;
        Y        = X[127:96];
        X[127:0] = {X[95:0]:T2[31:0]};
    }
    Qd_output[127:0] = {0:Y[31:0]};
``` where OP FUNC (B, C, D) is one of: ((((C XOR D) AND B) XOR D); (B XOR C XOR D); and (B AND C) OR ((B OR C) AND D)); and ROL (P, Q) is a left rotate of value P by Q bit positions.

24. A method as claimed in claim 21, wherein said further program instruction has a first input operand Qd[127:0] and a second input operand Qn[127:0] both read from said single instruction multiple data register file and said vector data value comprises Vm[Index+31:Index] where Index is 0 to $2^N$, where N is a positive integer, said further processing operation producing said output operand Qd_output[127:0] to have a value the same as given by the steps:

```
    X[127:0] = Qd[127:0];
    Y[127:0] = Qn[127:0];
    for (I = 0 to (2^N-1));
    {
        Index = (I*32);
        TCh[31:0] = Choose(Y[31:0], Y[63:32], Y[95:64]);
        TMaj[31:0] = Majority(X[31:0], Y[63:32], Y[95:64]);
        T1[31:0] = Y[127:96] + Sigma1(Y[31:0]) + TCh[31:0] +
        Vm[Index+31:Index];
        X[127:96] = T1[31:0] + X[127:96];
        Y[127:96] = T1[31:0] + Sigma0(X[31:0]) + TMaj[31:0]
        T2[31:0] = Y[127:96];
        Y[127:0] = {Y[95:0]:X[127:96]};
        X[127:0] = {X[95:0]:T2[31:0]}
    }
    Qd_output[127:0] = X[127:0];
``` where Choose(B, C, D) is (((C XOR D) AND B) XOR D), Majority(B, C, D) is ((B AND C) OR ((B OR C) AND D)), Sigma0(B) is (ROR(B,2) XOR ROR(B, 13) XOR ROR(B, 22)), Sigma1(B) is (ROR(B,6) XOR ROR(B, 11) XOR ROR(B, 25)) and ROR (P, Q) is a right rotate of value P by Q bit positions.

25. A method as claimed in claim 21, wherein said further program instruction has a first input operand Qd[127:0] and a second input operand Qn[127:0] both read from said single instruction multiple data register file and said vector data value comprises Vm[Index+31:Index] where Index is 0 to $2^N$, where N is a positive integer, said further processing operation producing said output operand Qd_output[127:0] to have a value the same as given by the steps:

```
    X[127:0] = Qn[127:0];
    Y[127:0] = Qd[127:0];
    for (I = 0 to (2^N-1));
    {
        Index = (I*32);
        TCh[31:0] = Choose(Y[31:0], Y[63:32], Y[95:64]);
        TMaj[31:0] = Majority(X[31:0], Y[63:32], Y[95:64]);
        T1[31:0] = Y[127:96] + Sigma1(Y[31:0]) + TCh[31:0] +
        Vm[Index+31:Index];
        X[127:96] = T1[31:0] + X[127:96];
        Y[127:96] = T1[31:0] + Sigma0(X[31:0]) + TMaj[31:0]
        T2[31:0] = Y[127:96];
        Y[127:0] = {Y[95:0]:X[127:96]};
        X[127:0] = {X[95:0]:T2[31:0]}
    }
    Qd_output[127:0] = Y[127:0];
``` where Choose(B, C, D) is (((C XOR D) AND B) XOR D), Majority(B, C, D) is ((B AND C) OR ((B OR C) AND D)), Sigma0(B) is (ROR(B,2) XOR ROR(B, 13) XOR ROR(B, 22)), Sigma1(B) is (ROR(B,6) XOR ROR(B, 11) XOR ROR(B, 25)) and ROR (P, Q) is a right rotate of value P by Q bit positions.

26. A computer program stored on a non-transitory computer readable storage medium which, when implemented on a computer provides a virtual machine execution environment corresponding to the data processing apparatus as claimed in claim 1.

\* \* \* \* \*